Aug. 26, 1969  J. F. G. MILLER ET AL  3,463,070
PANORAMIC AERIAL CAMERA

Filed Feb. 21, 1967  5 Sheets-Sheet 1

INVENTORS
JOSEPH F.G. MILLER
JOHN T. WATSON
BY
David A. Rich
ATTORNEY

Aug. 26, 1969  J. F. G. MILLER ET AL  3,463,070
PANORAMIC AERIAL CAMERA
Filed Feb. 21, 1967  5 Sheets-Sheet 2
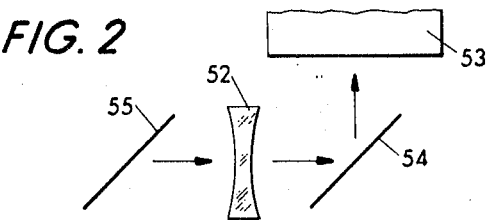
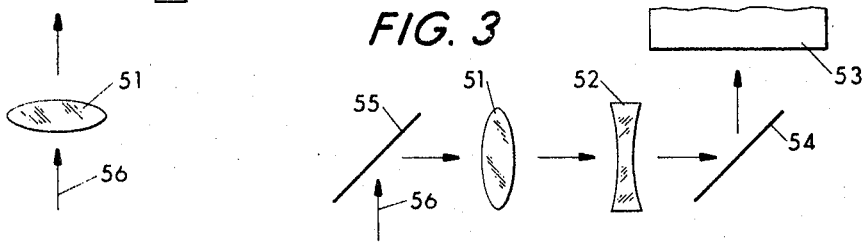
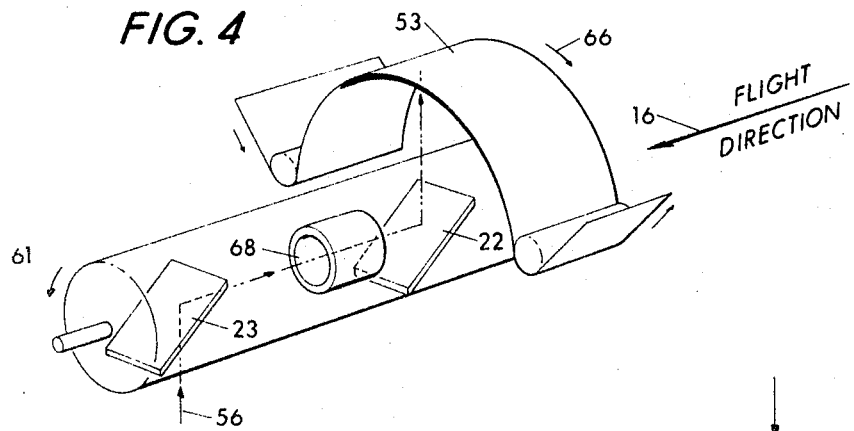
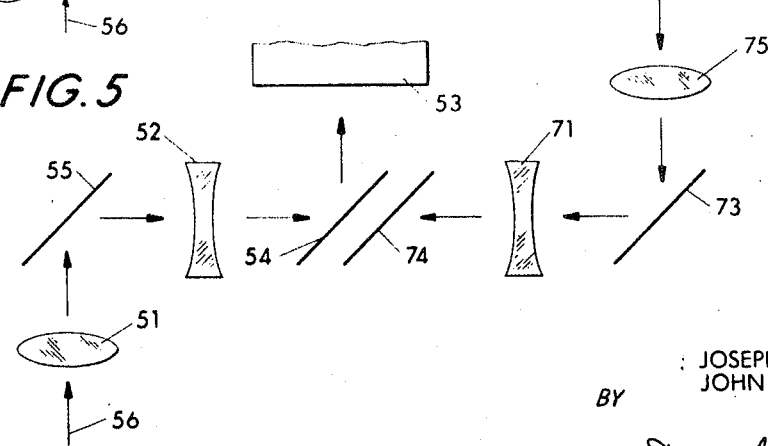
INVENTORS
JOSEPH F.G. MILLER
JOHN T. WATSON
BY
*David A. Rich*
ATTORNEY Aug. 26, 1969   J. F. G. MILLER ET AL   3,463,070
PANORAMIC AERIAL CAMERA
Filed Feb. 21, 1967   5 Sheets-Sheet 3
FIG. 6
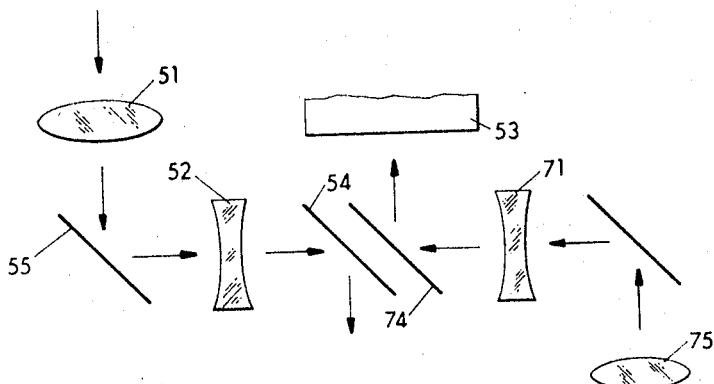
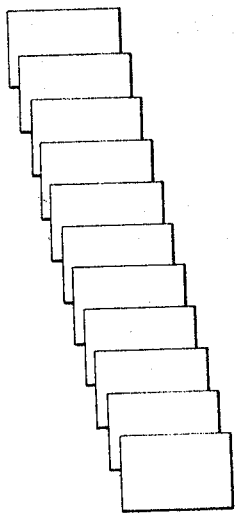
FIG. 7A
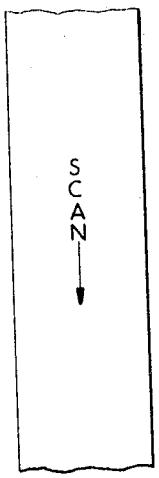
FIG. 7B
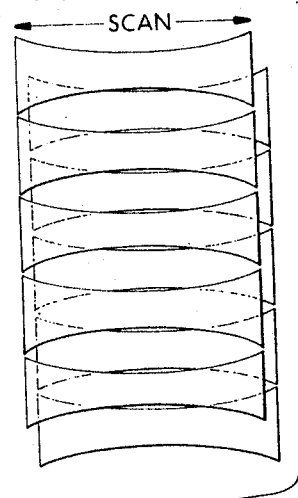
FIG. 7C
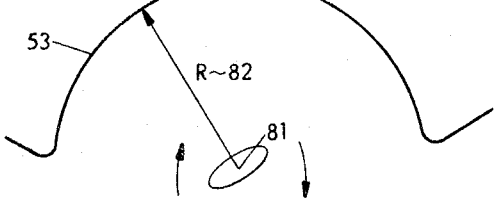
FLIGHT DIRECTION
FIG. 8
INVENTORS
JOSEPH F. G. MILLER
JOHN T. WATSON
BY
David A. Rich
ATTORNEY Aug. 26, 1969  J. F. G. MILLER ET AL  3,463,070
PANORAMIC AERIAL CAMERA
Filed Feb. 21, 1967  5 Sheets-Sheet 4

INVENTORS
JOSEPH F.G. MILLER
JOHN T. WATSON
BY

David A. Rich
ATTORNEY

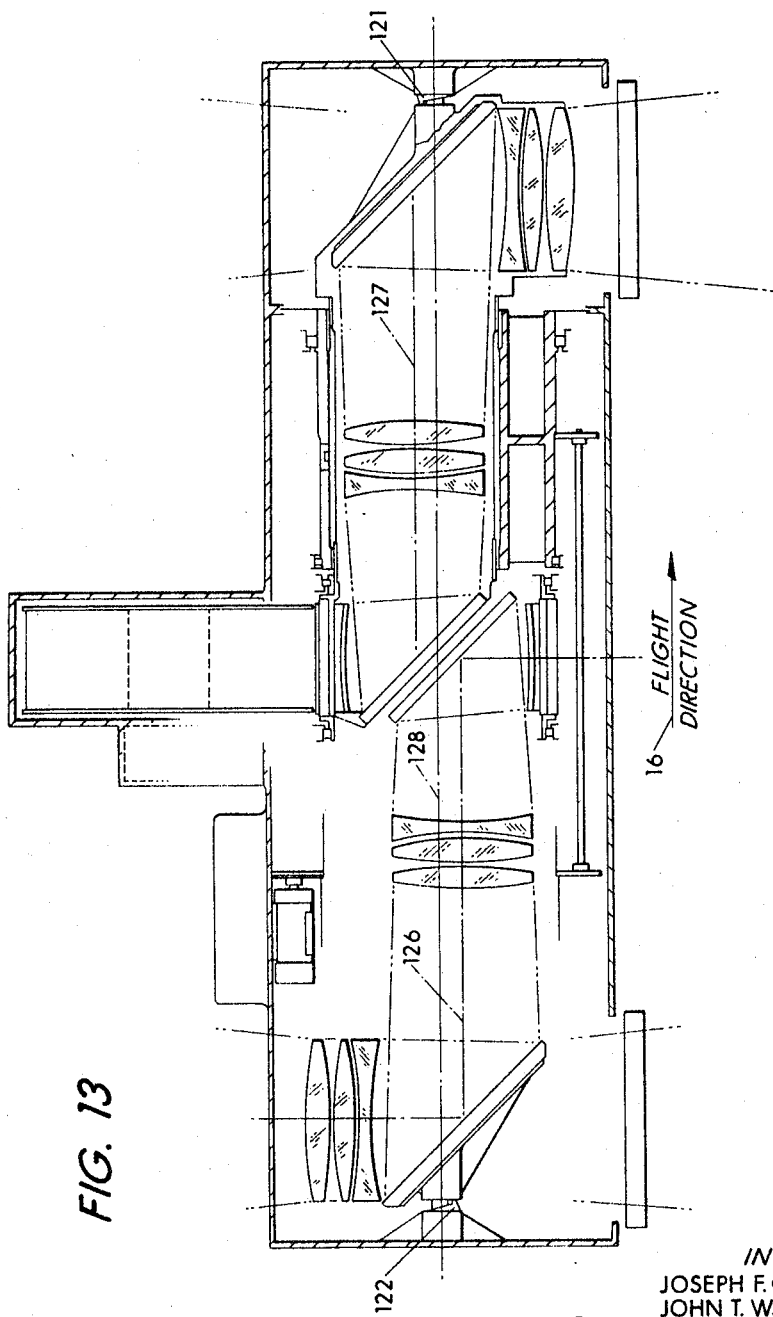

United States Patent Office 3,463,070
Patented Aug. 26, 1969

3,463,070
PANORAMIC AERIAL CAMERA
Joseph F. G. Miller, Lincoln, and John T. Watson, Wellesley Hills, Mass., assignors to Itek Corporation, Lexington, Mass., a corporation of Delaware
Filed Feb. 21, 1967, Ser. No. 617,678
Int. Cl. G03b 37/02
U.S. Cl. 95—16                                    9 Claims

ABSTRACT OF THE DISCLOSURE

A continuous scan panoramic camera which eliminiates overlapping or missing frames and utilizes slow scanning speeds to lower driving power required. This accomplished by having two lens systems 180° apart, and rotatably mounted on the camera. The two lens systems alternatively scan the object area and image it upon a synchronized, feeding, cylindrical film platen.

---

Figure 1:
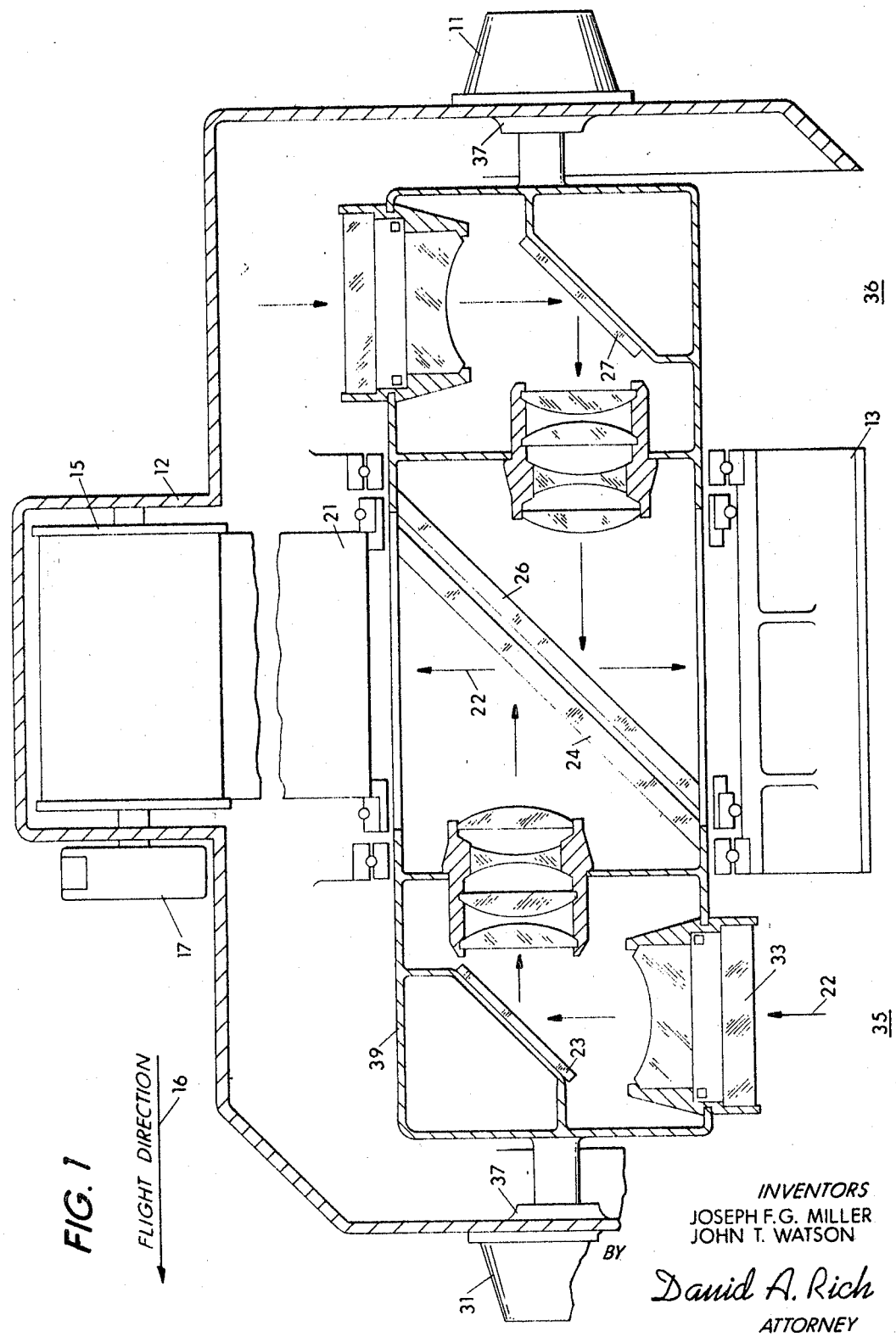

This invention relates to panoramic cameras, and more particularly to such cameras when used in aerial photography particularly for reconnaissance purposes.

Aerial photography has become an important industry. It's importance arises from the need to obtain photographic representation of the earth's surface from aircraft rapidly and economically. The use of this type of reconnaissance will no doubt be extend to surface studies of the various planets. To fill this need, there are three basic cameras available. The most conventional camera is the frame camera. The frame camera takes separate photographs, one after another, spaced only by a small time sequence. Another type of camera is the strip camera. The strip camera takes a continuous photograph (in the direction of flight) of the ground's surface as the airplane passes over. A third type of camera, and the subject of the present invention, is the panoramic camera. The panoramic camera takes a photograph of the ground's surface by scanning the surface below the aircraft from left to right or from right to left across the line of flight. As will be shown subsequently, FIG. 7 of the attached drawings illustrates very clearly the various types of photographs that the three distinct cameras provide. A shows the frame camera; here you see a series of photographs in the same direction as that of the aircraft. B shows the strip camera; here the scan of course is in the direction of flight. C shows the panoramic camera which shows that the scan swings from side to side, normal to the direction of flight.

The chief advantage of the panoramic camera is that it can scan from horizon to horizon providing considerable ground coverage. Other cameras can photograph only small segments of the earth's surface during each flight. In contrast, the panoramic camera during only one flight over a given area can attain all the necessary photography, while cameras of other types require several passes over the same area to obtain a sufficient number of photographs. Another advantage of the panoramic camera is that it can use a lens with a very narrow field of view having a long focal length and providing excellent resolution.

Advantages of panoramic cameras are: they are most suitable in applications requiring large area coverage and high resolution. The relatively narrow field angle permits lens designers in the panoramic type of camera to achieve an image close to perfection for the required focal length and aperture over the entire scan.

In a panoramic camera with statioiary film, the lens revolves about its nodal point and the film that records the stationary image is one focal length away from the rotating lens. When large focal lengths are required the camera becomes large. The present invention permits folding the focal length thus providing a more compact camera.

The present invention provides a camera having a revolving lens system that scans the ground surface from horizon to horizon continuously. 180° of viewing can be continuously attained, for when one scan is completed, a second scan is immediately instituted. This first and second scan completes one cycle of the panoramic camera. Obviously, then, with the present invention the camera constantly scans the surface below the aircraft in which the camera is mounted, recording complete details of the ground surface. The cycle speed of this particular panoramic camera can thus be substantially reduced for speed of scanning is a function of the required number of photographs, air speed and altitude. Since the camera is able to take photographs continuously, the problems of overlapping or missing frames that plague prior art panoramic cameras is eliminated. With a single lens system complete horizon to horizon scanning is possible only by doubling the scanning speed relative to that required herein.

A difficult problem with aerial photography is that the aircraft is moving with respect to the ground. Consequently, the image on the film moves in the direction of flight of the aircraft. In order to compensate for this, the lens of the camera, or alternatively the film with respect to the lens, must be moved at a speed which is a function of the motion of the aircraft over the ground. This factor is usually referred to as image motion compensation or IMC. The present invention by means of a simple cam attached to the shaft of the rotating optical system provides the compensation that is necessary.

The camera of the present invention has exceptionally smooth running and mechanically well balanced characteristics. It is characterized by continuous motion, that is: the optical system revolves continuously and the film moves continuously. Due to this constant speed, very little power is required to overcome inertia of the system and keep it moving smoothly. Furthermore, there is very little film waste. Image motion compensation is sinusoidal in character for when the aircraft is going over the ground surface with the camera pointed directly below, a great deal (or maximum) of image motion compensation is required. When the camera is pointing to the left horizon or right horizon the amount of image compensation required is minimized. Accordingly, the cam is shaped to provide a sinusoidal movement as the lens points from left horizon to the center and then to right horizon. A smooth transition is effected of the scanning of one lens into scanning by the other lens. This enables a lower scanning speed and a balanced image motion compensation mechanism.

An object of this invention is to provide a panoramic camera having long focal lengths with a minimum camera bulk.

Another object of this invention is to provide panoramic cameras having folded optical paths.

Another object of this invention is to provide panoramic cameras having two scanning lens systems with only one film.

Another object of this invention is to provide a panoramic camera that is characterized by smooth, continuous uninterrupted movement of the film and optical elements.

Figure 9:
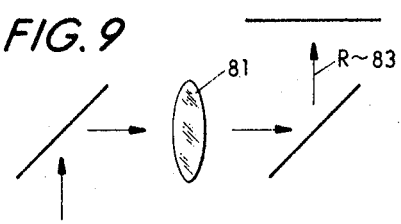
Figure 10:
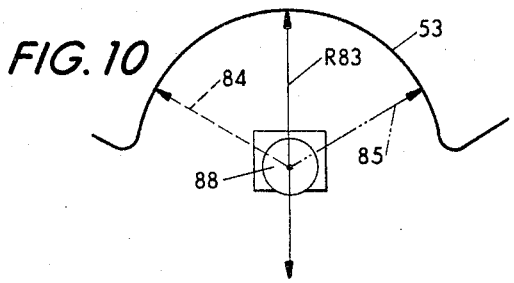
Figure 11:
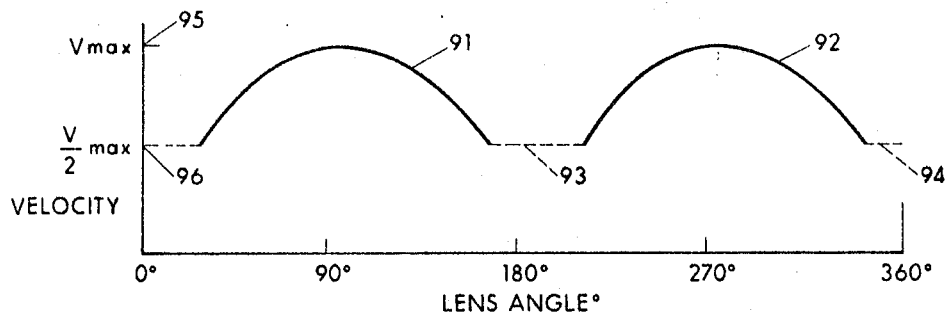
Figure 12:
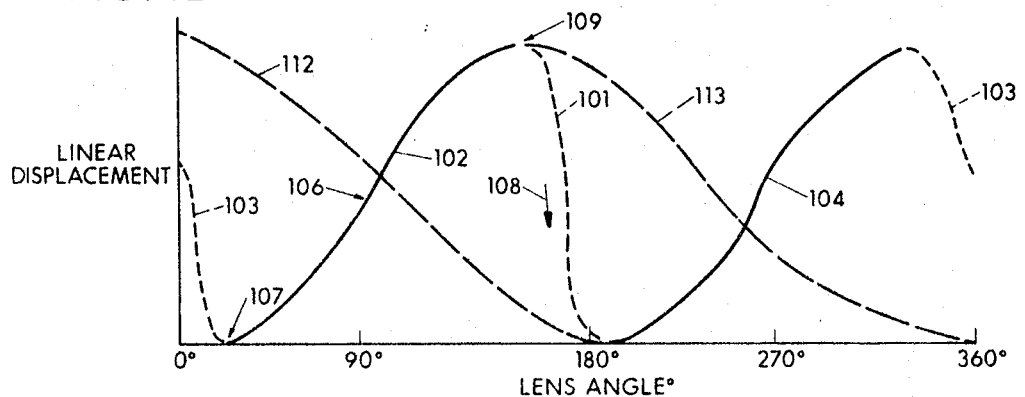

Other objects, features and advantages of the present invention will become more apparent from the specification when read in connection with the attached drawings, of which: FIG. 1 shows a panoramic camera from its side. FIG. 2 shows the folded focal length of the panoramic camera. FIG. 3 shows a much longer camera structure required of an undivided lens system. FIG. 4 shows a single lens system in a revolving optical bar. FIG. 5 shows a double optical bar system. FIG. 6 shows the same system in FIG. 5 with the second lens in photographic position. FIG. 7 shows three types of aerial photographs. FIG. 8 shows the basic lens system with stationary film and revolving lens of a panoramic camera. FIG. 9 shows the folded focal length revolving lens system. FIG. 10 shows the same system as FIG. 9 from an end view. FIG. 11 shows image motion compensation velocity with lens angle. FIG. 12 shows linear displacement of the cam to provide velocity of FIG. 11. FIG. 13 shows a second embodiment of the present invention.

Referring now to FIG. 1 we see a panoramic camera which embodies the principles of the present invention. The camera 12 is mounted on base 13 in an aircraft which maintains direction 16. The light from the ground that is being scanned enters as arrow 22 passes through part of the lens system 33 reflects off mirror 23 passes through the remaining elements of the lens system and impinges on mirror 24 finally striking film 21. The entire optical bar 39 rotates with the panoramic camera 12 about bearings 37 which are located at either end of the camera. Motor 11 drives optical bar 39. We also note that spool 15 contains film. The motor 17 drives the spool causing film to pass over the platen such that the light entering the camera and the lens system causes an image to be placed on the film. We note that light 22 enters opening 35. After the lens has made an 180° turn the right hand part of the optical bar commences to permit light to enter the camera through opening 36. Optical bar 39 permits light to enter first one opening 35 then (ceasing to permit light to enter that opening) permits light to enter another opening 36. At the left end of the camera, we see a special shaped cam that causes the entire optical bar to move in the direction opposite to that of flight when the camera is in the position indicated. That is, when the optical bar is in perfect alignment over the ground scene. This causes the optical bar to move very quickly toward the right. The image thus appearing on film 21 appears to stand still. The effect of the motion of the aircraft which carries the camera with respect to the ground is therefore compensated. Greater details of operation of the camera can be better understood by more graphic illustrations.

Referring to FIG. 4, we note flight direction 16. Optical bar 61 rotates as the arrow indicates. Film 53 moves in the opposite direction indicated by arrow 66. Light 56 enters the bottom of the camera and strikes a mirror 23 mounted at a 45° angle within the optical bar. The light after striking the mirror passes through a lens system 68 and strikes another mirror 22 mounted at a 45° angle; the light then is reflected upward and strikes the film 53 causing an image to be photographed thereon. This figure illustrates one-half of the optical bar system shown in FIG. 1 Certain important features of the invention are illustrated, that is: the reflection of the two mirrors mounted at 45° angles, and lens system 68 which is of course highly idealized.

Referring to FIG. 2 we see that lenses 51 and 52 are mounted on either side of mirror 55. While in FIG. 3 we see lens element 51 and lens element 52 both mounted on the optical bars axis and the mirror no longer interposed between the two lens elements. It should be quite obvious from FIG. 2 and FIG. 3 that a great deal of space is sacrificed (that is, the camera will necessarily be much longer) with the lens element close together as they are in FIG. 3 as opposed to the separation of the lens elements by means of mirror 55. The lens elements must necessarily be separated by a certain distance in order to achieve the long focal lengths contemplated by the present invention. Consequently separation of the lens elements as they appear in FIG. 2 is most desirable.

Referring again to FIG. 1, we see this concept is put to work in the present invention. Two of the lens elements are on one side of mirror 23 and the four remaining lens elements are on the opposite side of mirror 23.

Referring to FIG. 5 we see that light 56 is permitted to enter the camera through lens element 51, it strikes mirror 55, passes through another lens element 52 then strikes a second mirror 54 and finally arriving at film plate 53. We also note a second lens system identical to the above having components indicated by lens 75, mirror 73, lens 71 and again mirror 74. Referring to FIG. 6 we see that the same optical bar after it has been rotated 180°. Light 56 now enters the camera through lens 75, strikes mirror 73, passes on and through lens 71 to strike lens 74, and then strikes film 53. This then illustrates the operation of the double bar rotating optical bar panoramic camera. As presently contemplated the area that lens 51 scans is separate and distinct from the area that lens 75 will scan. There will be some overlapping of the two areas that the lenses scan; however, the panoramic photographs will be serial, one after another with slight overlapping, but nevertheless distinct from one another and covering separate areas of the ground.

Referring to FIG. 8 we see a simple lens with node point 81. We also see a film having curved surface 53. The lens is caused to rotate about node 81 and the distance or radius arm 82 as in this case equal to the focal length. As the lens rotates an image is placed on the film, which is stationary, from left to right. This operation is well known in the art with reference to panoramic cameras; however, when we refer to FIG. 9 we see that lens 81 is now interposed between two mirrors and R83 has a much smaller dimension. Here we see the focal length has been folded. Referring to FIG. 10 we see the curve film 53 now and we also note that the radius of R83 which was folded, is much smaller than in the previously discussed rotating lens system in FIG. 8. We can see from this then that the focal length, or the distance that the film, or any point on the film along arc 53 is always the proper distance from lens 81, however, as we will proceed to demonstrate R has a relationship to the focal length that must be very strictly observed.

To illustrate the development for R, the radius of the optical bar system is to rotate about, we let:

1 $\quad F\theta =$ (amount of film to be scanned)

This would be true in any event, as is illustrated in FIG. 8 the focal lenth is one dimension and the angle that it swings through is the other dimension, in radians as Equation 1 illustrates. In Equation 1 then F equals the focal length and $\theta$ is equal to the angle scanned in radians. We also note, if we have a folded camera that:

2 $\quad R\theta =$ (the amount of film on the platen)

where R is the radius of platen curvature. We also know that the amount of additional film which must be placed on the cylindrical platen during the scan must equal the difference between the total amount required, $F\theta$, and the amount already on the platen, $R\theta$, or 3 $\quad (F-R)\theta$ This film is moving at a constant rate onto the platen and at the end of scan all film on the platen is exposed. New film will be placed on the platen during the non-exposure fraction of the cycle. The amount of new film supplied will be 4 $\quad (F-R)(2\pi -\theta)$ assuming that the film is supplied at the same rate as during the exposure part of the cycle. To have this new film replace the remaining exposed film in the arc $R\theta$ we have the following relationship:

5  $\quad R\theta = (F-R)(2\pi - \theta)$

This relationship simplifies to

6  $$R = F\frac{(2\pi - \theta)}{2\pi}$$

or in degrees

6a  $$F\frac{(360° - \theta)}{360°}$$

for the single lens constant film motion panoramic camera.

For the twin lens constant film motion panoramic camera the resulting expression is 7  $$R = F\frac{(\pi - \theta)}{\pi}$$

or in degrees

7a  $$F\frac{(180° - \theta)}{180°}$$

Thus we have seen in the above development that the radius of the film platen is a function of the focal length of the film and a preselected scan angle. We also note, that the radius of curvature is different when a single lens system as opposed to a double lens system. This is naturally related to the fact that the lens system, with a single lens, is operating through 360° or the entire cycle, while a two lens system is only operating through 180°. If this were not the case, the radius would permit overlapping or double exposure of film.

Summarizing, we see that the optical bar rotates continuously, and the film also moves continuously. The optical bar has one lens pointing towards the ground at any given moment and when it stops photographing, another lens comes into view and starts photographing. This alternate filming with the two lenses provides continuous filming through the entire flight. It is to be noted in the usual camera, in this case the one we have selected for illustration purposes, the lens scans 135° (180° would be from horizon to horizon) therefore as one lens completes its viewing there is a pause before the second lens commences its viewing or scanning.

The image motion compensation cam 31 in FIG. 1 as is suggested, compensates in a smooth manner for the image motion that would appear of the ground with respect to the aircraft. The maximum velocity of the image is experienced when the camera is photographing the ground immediately under the aircraft. When the camera is photographing the ground nearest either horizon the velocity drops down substantially to zero. At a scan angle of 60° off nadir the velocity drops to substantially half the maximum velocity. The maximum velocity is determined by the aircraft speed and altitude that the camera is designed to accommodate. Referring to FIG. 11 the transition from maximum velocity 95 to minimum velocity 96 with angular position is shown. Curves 91 and 92 show a common gradual increase to a maximum and gradual descent back to minimum velocity. Below an image motion velocity indicated at 96, the translational motion of the optical system along the rotation axis reverses to bring the optical bar into the starting position for image motion compensation for the second lens system. These curves represent a scan angle of 30° to 150° for a two lens system. This corresponds with ±60° from nadir. In contrast, single lens viewing is limited to that portion of the cycle illustrated by the curve 91.

FIG. 12 shows the linear displacement that the cam must provide in the optical bar so that the proper velocity will be provided at the proper point in time. The linear displacement shown is opposite to the line of flight as indicated by arrow 108. The displacement 102 starts at zero 107 and reaches its *maximum rate* at 106 declines and 109 (maximum displacement) the lens is reset along any smooth path as 101 to start a new displacement 104 for the second lens. A single lens system would be nearly the same except it would have more time between linear displacements to reset the lens for a retake of photographs.

Examining FIG. 12 still further we can see that with dotted lines 113 and 112, the curves become sinusoidal and 180° out of phase with one another. The two curves illustrate smooth operation; however, two separate cams are required. In FIG. 13 a cam 121 drives one-half of the optical bar and a second cam 122 drives the other half of the optical bar. Such a camera is depicted as an alternate embodiment. Note that the optical axes 126 and 127 are offset from the axis of rotation. This camera also scans 135° as the earlier embodiment. From an examination of the formula Equation 7 we see that we could not possibly scan 180° with a two lens system, we could however scan 135° and of course with a single lens system Equation 6 we could scan 180°.

It should be noted here, in actual practice it has been found advisable to make "R" slightly smaller and to increase film speed an infinitesimal increment to that dictated by the formula. The frames become separated slightly on the film making it much easier to read when the above parameters are so altered.

Although we have described our invention with reference to particular apparatus, it is to be clearly understood that those skilled in the art may make many substitutions without departing from the true spirit and scope of our invention; we therefore wish to be limited only by the appended claims.

We claim:

1. A panoramic aerial camera, comprising:
   a camera body having a viewing opening along a viewing axis;
   lens carriage means rotatably mounted in said body for rotation about a rotation axis;
   a lens means coupled to said carriage means and rotatable about said rotation axis, said lens means having an optical axis parallel to said rotation axis and adapted for viewing along one said viewing axis;
   drive means for rotating said lens means about said rotation axis;
   cylindrical platen means spaced from said viewing opening along said rotation axis for receiving photographic film and having its cylinder axis parallel to said optical axis;
   film feed means for feeding said film along said platen means to conform the shape of said film with that of said platen means; and
   means coupling said lens means for exposing said conformed film to said viewing opening;
   said camera body including a second viewing opening spaced from the first said viewing opening and having a second viewing axis parallel to the first said viewing axis;
   a second lens means coupled to said carriage means and rotatable about said rotation axis, said second lens means having a second optical axis parallel to said rotation axis and adapted for viewing along said second viewing axis, said first and second lens means being adapted for viewing alternately;
   drive means for rotating said second lens means about said rotation axis; and
   said coupling means coupling each said lens means alternately for exposing said conformed film to each said viewing opening.

2. The panoramic aerial camera of claim 1 wherein:
   each said lens means has a narrow field of view, the distance between its rotation axis and the cylindrical surface of the platen being in accordance with the focal length of the lens multiplied by the ratio of the difference between one-half of one complete angular revolution and the scan angle divided by one-half of one complete angular revolution.

3. The panoramic aerial camera of claim 1, wherein: said viewing axes are normal to said rotation axes.

4. The panoramic aerial camera of claim 1, wherein: said first and second lens means are coupled for translation together in the same direction along its rotation axis.

5. The panoramic aerial camera of claim 1, wherein: said first and second lense means are independently mounted for translation in opposite directions to achieve dynamic balance.

6. The panoramic aerial camera of claim 1, wherein: said exposure axis is normal to said rotation axis.

7. The panoramic aerial camera of claim 1, wherein: image motion compensation means are provided to translate said lens means along said rotation axis opposite the direction of motion of a vehicle in flight.

8. The panoramic aerial camera of claim 1, wherein: said optical axes are uniformly displaced with respect to said rotation axis with said rotation axis therebetween.

9. The panoramic aerial camera of claim 1, wherein: each said lens means includes reflecting surfaces for receiving light along a viewing axis reflecting it along the optical axis and further reflecting it along the exposure axis.

References Cited

UNITED STATES PATENTS 3,059,528  10/1962  Allan _____ 95—16

NORTON ANSHER, Primary Examiner

DAVID B. WEBSTER, Assistant Examiner

U.S. Cl. X.R.

95—12.5, 15